United States Patent
Oláh

(10) Patent No.: US 6,957,059 B2
(45) Date of Patent: Oct. 18, 2005

(54) METHOD AND DEVICE FOR REGISTERING AND CONNECTING COLLECT CALLS WITH INTELLIGENT NETWORK SERVICES

(75) Inventor: Géza Oláh, Budapest (HU)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/633,310

(22) Filed: Aug. 4, 2003

(65) Prior Publication Data

US 2004/0102180 A1 May 27, 2004

(30) Foreign Application Priority Data

Aug. 5, 2002 (DE) ........................................ 102 35 798

(51) Int. Cl.[7] ...................... H04M 11/00; H04M 15/00; H04Q 7/20
(52) U.S. Cl. .................... 455/406; 455/466; 379/114.21
(58) Field of Search ................................ 455/406, 407, 455/466, 405; 379/114.21, 144.07, 144.02, 144.05, 114.06, 114.23

(56) References Cited

U.S. PATENT DOCUMENTS

| | | | | |
|---|---|---|---|---|
| 5,027,387 A | * | 6/1991 | Moll | ..................... 379/115.02 |
| 5,473,671 A | * | 12/1995 | Partridge, III | ............... 455/445 |
| 5,680,443 A | * | 10/1997 | Kasday et al. | ............ 379/88.13 |
| 5,937,043 A | * | 8/1999 | He | .......................... 379/114.14 |
| 6,138,006 A | * | 10/2000 | Foti | ......................... 455/414.1 |
| 6,310,944 B1 | * | 10/2001 | Brisebois et al. | ....... 379/142.01 |
| 6,792,261 B2 | * | 9/2004 | Ogman et al. | ............... 455/403 |
| 2002/0183040 A1 | * | 12/2002 | Lundstrom et al. | ......... 455/406 |
| 2004/0063432 A1 | * | 4/2004 | Borsan | ....................... 455/445 |

FOREIGN PATENT DOCUMENTS

| | | |
|---|---|---|
| DE | 3149412 A | 6/1983 |
| NL | 1013397 C2 | 10/1999 |

* cited by examiner

*Primary Examiner*—Rexford Barnie
(74) *Attorney, Agent, or Firm*—Morrison & Foerster LLP

(57) ABSTRACT

An effective possibility for making collect calls available is provided by a method for registering and connecting a collect call characterized in that a calling mobile station sends a USSD message concerning a desired collect call with another mobile station to an intelligent network service in a communication network. The service in the communication network sends a text message with an inquiry concerning the transfer of costs for the collect call to the other mobile station. It is then determined by the other mobile station whether there is a willingness there to accept transfer of the costs of the collect call, and the other mobile station will call back the calling mobile station if cost transfer is has been accepted.

15 Claims, 1 Drawing Sheet

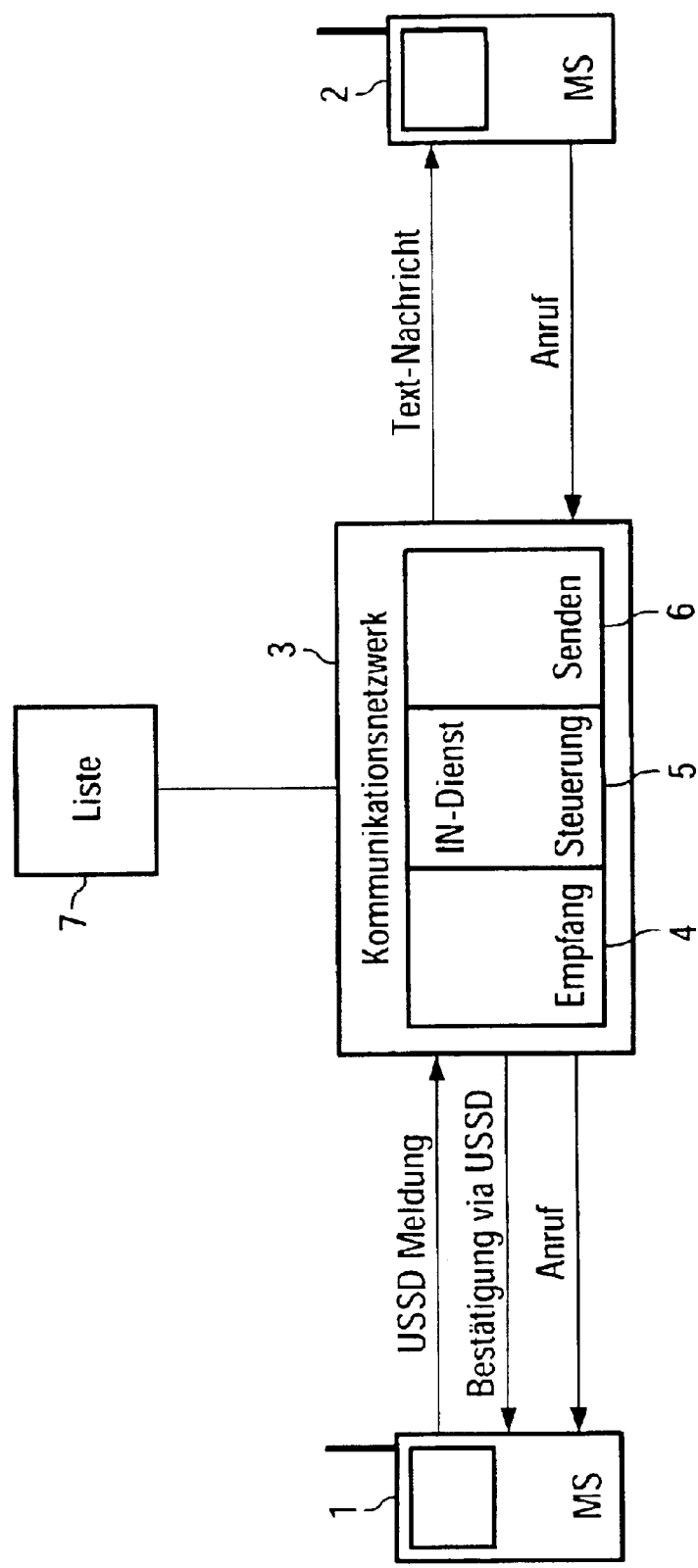

METHOD AND DEVICE FOR REGISTERING AND CONNECTING COLLECT CALLS WITH INTELLIGENT NETWORK SERVICES

CLAIM FOR PRIORITY

This application claims priority to International Application No. 10235798.6 which was filed in the German language on Aug. 5, 2002, which is hereby incorporated by reference.

TECHNICAL FIELD OF THE INVENTION

The invention relates to a method and device for registering and connecting collect calls with intelligent network services (IN services).

BACKGROUND OF THE INVENTION

DE 3149412 A1 describes a circuit arrangement for establishing connections that are free of charge for the calling party to pre-specified subscriber lines in a telephone call processing system. The directory number of the assigned subscriber line is determined by dialing a special service number then suffix-dialing a number designating pre-specified subscriber lines. When the connection has been successfully switched through, call-charge logging takes place in each case to the account of the pre-specified other subscriber line. Dialing the special service number serves to access a private automatic branch exchange connected to the relevant local exchange. This private automatic branch exchange also performs the functions of determining the directory number and of establishing the remainder of the connection to the pre-specified other subscriber line. With the aid of announcement equipment, attendant consoles, and subscriber lines connected to the private automatic branch exchange, the calling party receives appropriate support that may comprise the conveying of announcement texts, the provision of information, or entering of the directory number at the attendant console.

NL1013397 C2 proposes that an owner of a telephone number selects other telephone numbers and authorizes these to call the owner's directory number at the owner's expense. These numbers are supported by the operator of the network via which the owner of a telephone number is connected.

There are situations in which a communication network subscriber would like to conduct a call with other subscribers at their expense when. For example, when a pre-paid account of a mobile station or SIM card is exhausted or when company employees are willing to be accessible for business purposes on their private mobile station, but are not prepared to call their company at their own expense. Operators of fixed networks offer collect calls (telephone calls the connection costs of which are charged to the called line). The use of collect calls is very tedious and expensive for both parties. Operators incur high personnel costs as the result of providing a service of this type because this type of service is at present only switched by an attendant (manual switching). Mobile network operators do not offer this service owing to the high personnel costs thereby incurred.

Another solution would be for the calling party to send an SMS message to another party to the effect that the calling party wishes to be called back. Charges will still be due even though the SMS message costs little. As no more SMS messages can be sent if a pre-paid account is exhausted, this solution will not work in that case. The same applies if the calling party only calls another party for a very brief period and requests a callback.

SUMMARY OF THE INVENTION

The present invention relates to an efficient and cost-effective method and device for registering and connecting collect calls in a communication network.

In one embodiment of the invention, there is a method employing an intelligent network service (IN service). A calling mobile station sends a text message, preferably a USSD message, to an IN service in the communication network and this service informs another mobile station by means of a text message. If it accepts assuming the costs, the other mobile station can then call back the calling mobile station. One advantage of the invention is that there is no manual switching and the callback request can be sent free of charge for the calling mobile station. For the network operator, this means lower personnel costs and additional sales revenue from calls. The use of USSD messages is particularly opportune for the intelligent network structure because the subscriber is directly able to influence data on supplementary services stored in the HLR and activate SS procedures. Another advantage of USSD messages compared to SMS messages is that a USSD message does not have to be composed "manually". The mobile station software can be expanded to allow a callback request to be entered from the menu.

BRIEF DESCRIPTION OF THE DRAWINGS

The invention is described in detail below with the aid of an embodiment shown in the figure.

FIG. 1 shows an intelligent network service (IN service).

DETAILED DESCRIPTION OF THE INVENTION

FIG. 1 shows an architecture of a device according to the invention and the flow of operations taking place when a collect call is connected in a communication network. The calling mobile station (MS) (1) does not call the other mobile station (MS) (2) directly but sends a text message, such as a USSD message, to a service in the communication network (3). USSD is a GSM protocol which, similarly to SMS, exchanges information or messages between a mobile station (MS) (1) and a communication network (3). The USSD message does not have to be composed "manually". The mobile station software can be expanded to allow a callback request to be entered from the menu. The access code then no longer has to be entered manually and the directory number can be taken from the telephone book. The service then informs the other mobile station (MS) (2) by means of a text message, such as an SMS or USSD message, about the desired call. The other mobile station (MS) (2) can then call back the calling mobile station (MS) (1) if it (2) is willing to accept the costs of the call. The USSD message sent from the MS (1) to the service (3) is structured as follows: **<access code>#>directory number>#<other data (optional)>. The other data can include, for example, a specified time for a callback if the calling mobile station (MS) (1) does not want to be called back immediately. The message proceeds via a receive unit (4) to the IN service in the communication network (3) and is evaluated and checked by a control element (5) of the service. If the message contains incorrect syntax, an error message will be sent in the reply text message to the calling mobile station (MS) (1) with a send unit (6). A text message will otherwise be composed by the control unit (5) and sent to the other mobile station (MS) (2) with the send unit (6). The text message is structured such that the directory number of the calling mobile station (MS) (1) is displayed as the sender's address alongside other optional data. The "other data" is optional. A time for a callback request can be specified here, for instance. It is important for the IN service to check the data and send it in a text message to the other mobile station (MS) (2) if the data does not signify any direct communication (exchange of information not relevant to service). This will ensure that the additional data allowed by the network operator is actually forwarded and that the IN service is used for charge-free communication. If the other mobile station (MS) (2) supports direct calling back of the directory number of the calling mobile station (MS) (1) in the text message, the other mobile station (MS) (2) can call back the calling mobile station (MS) (1) at the press of a button if that station (2) is willing to accept the call costs. The directory number of the calling mobile station (MS) (1) will also be sent to the other mobile station (MS) (2) if the calling mobile station (MS) (1) otherwise does not allow its directory number to be displayed. The text of the text message informs the other mobile station (MS) (2) about the callback request of the calling mobile station (MS) (1). The calling mobile station (MS) (1) receives confirmation of the successful dispatch of the text message to the other mobile station (MS) (2) via a text message, such as a USSD message. The IN service can also be expanded with features—known from other services—such as a black list. A list (7) of this type can be used to prevent callback requests from special directory numbers (charge-free directory numbers, 0190 directory numbers, etc.) (=black list) or to allow them (=white list) or, if the network operator only wishes to allow the service between its own customers, that operator can configure the IN service accordingly with a list (7) of this type.

What is claimed is:

1. A method for registering and connecting a collect call, comprising:

sending a text message, via a calling mobile station, about a desired collect call with another mobile station to an intelligent network service in a communication network;

sending text message, via the service in the communication network, with an inquiry about acceptance of transferring the collect-call costs to the another mobile station; and determining, via the another mobile station, whether to accept transfer of the costs of the collect call, wherein the another mobile station calls the calling mobile station if cost transfer is has been accepted.

2. The method according to claim 1, wherein the communication network is a telecommunications network.

3. The method according to claim 1, wherein the communication network is a cellular mobile radio network.

4. The method according to claim 1, wherein the service of the calling mobile station sends a text message as confirmation.

5. The method according to claim 1, wherein the text message is an SMS message.

6. The method according to claim 1, wherein the text message is a USSD message.

7. The method according to claim 1, wherein the text message is an MMS message.

8. The method according to claim 1, wherein the text message to the another mobile station includes a directory number of the calling mobile station.

9. The method according to claim 8, wherein the text message to the another mobile station sends the directory number of the calling mobile station even if not displayed.

10. The method according to claim 8, wherein the directory number of the calling mobile station is used as the sender's address of the text message.

11. The method according to claim 1, wherein the text message to the another mobile station includes a specified time for the callback.

12. The method according to claim 1, wherein acceptance of cost transfer by the another mobile station has been established.

13. The method according to claim 1, wherein checking the acceptance of cost transfer is subject to control of the communication network.

14. The method according to claim 1, wherein checking the acceptance of cost transfer in the communication network takes place by applying at least one list.

15. A system for registering and connecting a collect call, comprising a calling mobile station sends a text message about a desired collect call with another mobile station to an intelligent network service in a communication network, wherein the service in the communication network sends a text message with an inquiry concerning acceptance of transferring the collect-call costs to the other mobile station, and is determined by the other mobile station whether to accept transfer of the costs of the collect call, and the other mobile station calls the calling mobile station if cost transfer has been accepted.

* * * * *